United States Patent [19]

Lehner et al.

[11] Patent Number: 5,765,527
[45] Date of Patent: Jun. 16, 1998

[54] METHOD AND ARRANGEMENT FOR CONTROLLING THE TORQUE OF AN INTERNAL COMBUSTION ENGINE

[75] Inventors: Vera Lehner, Tamm; Gerard Melchior, Schwieberdingen, both of Germany

[73] Assignee: Robert Bosch GmbH, Stuttgart, Germany

[21] Appl. No.: 765,773

[22] PCT Filed: Mar. 29, 1996

[86] PCT No.: PCT/DE96/00613

§ 371 Date: Jan. 13, 1997

§ 102(e) Date: Jan. 13, 1997

[87] PCT Pub. No.: WO96/35874

PCT Pub. Date: Nov. 14, 1996

[30] Foreign Application Priority Data

May 13, 1995 [DE] Germany .................. 195 17 673.1

[51] Int. Cl.⁶ .................................................. F02M 3/00
[52] U.S. Cl. ............................................... 123/339.1
[58] Field of Search ................... 123/339.16, 339.17, 123/339.18, 339.1; 62/133

[56] References Cited

U.S. PATENT DOCUMENTS

| | | | |
|---|---|---|---|
| 4,582,032 | 4/1986 | Hara et al. | 123/339.16 |
| 4,592,320 | 6/1986 | Peter et al. | 123/339.1 |
| 5,163,399 | 11/1992 | Bolander et al. | 123/339.17 |
| 5,253,623 | 10/1993 | Melnyk et al. | 123/339.1 |
| 5,285,649 | 2/1994 | Yamanaka et al. | 62/133 |
| 5,385,029 | 1/1995 | Yamanaka et al. | 123/339.17 |
| 5,542,389 | 8/1996 | Miyamoto et al. | 123/339.1 |
| 5,575,255 | 11/1996 | Abe et al. | 123/336 |

FOREIGN PATENT DOCUMENTS 2-019635  1/1990  Japan ................. 123/339.1

*Primary Examiner*—Raymond A. Nelli
*Attorney, Agent, or Firm*—Walter Ottesen

[57] ABSTRACT

A method and an arrangement for controlling the torque of an internal combustion engine are suggested wherein the engine is operated at an operating point at least at idle wherein a pregiven torque reserve is present via the ignition angle for a more rapid reaction to load changes.

9 Claims, 3 Drawing Sheets

METHOD AND ARRANGEMENT FOR CONTROLLING THE TORQUE OF AN INTERNAL COMBUSTION ENGINE

BACKGROUND OF THE INVENTION

A method and an arrangement of this kind are disclosed in DE 34 39 927 C2 (U.S. Pat. No. 4,592,320). There, measures for compensating a rpm change when switching in a load are shown in the context of an idle air control. The load can, for example, be a climate control apparatus, a transmission, a blower, a clutch, et cetera. The measures comprise a precontrol of the idle air controller for which the air supply to the engine is increased when switching on the load independently of the controller. The increase factor of the air supply is then adapted on the basis of the controller output signal in the controlled state. In principle, the effect of the change of the air supply on the torque or on the rpm of the engine only occurs after a time delay. For this reason, the known method and known arrangement exhibit an unsatisfactory performance in some applications. In these applications, the load change leads to relatively large torque or rpm changes or rpm fluctuations as a consequence of the delayed torque change. This can affect the driving comfort and driving performance.

SUMMARY OF THE INVENTION

It is therefore an object of the invention to provide measures with the aid of which the torque change of the engine can be carried out without delay. The torque change is necessary because of the change in load.

The procedure according to the invention improves the driving comfort and the driving performance of an internal combustion engine when there is a change in engine load. The engine torque tracks without delay a torque change caused by the load change.

Special advantages result from the procedure of the invention when applied to an idle control. Load changes operate very greatly on the torque, which is to be outputted by the engine, in the idle operating state or in the operating state near idle. Accordingly, in this operating state, the procedure of the invention achieves a considerable improvement of the driving comfort as well as in the rapidity of the control.

It is especially advantageous that the torque reserve, which, according to the invention, is pregiven in each operating point of the engine, is the same in magnitude in the steady-state condition for each operating point so that the control reacts correspondingly fast to load changes in each operating point.

BRIEF DESCRIPTION OF THE DRAWING

The invention will be explained in greater detail with respect to the embodiments shown in the drawing.

DESCRIPTION OF THE PREFERRED EMBODIMENTS OF THE INVENTION

Figure 1:
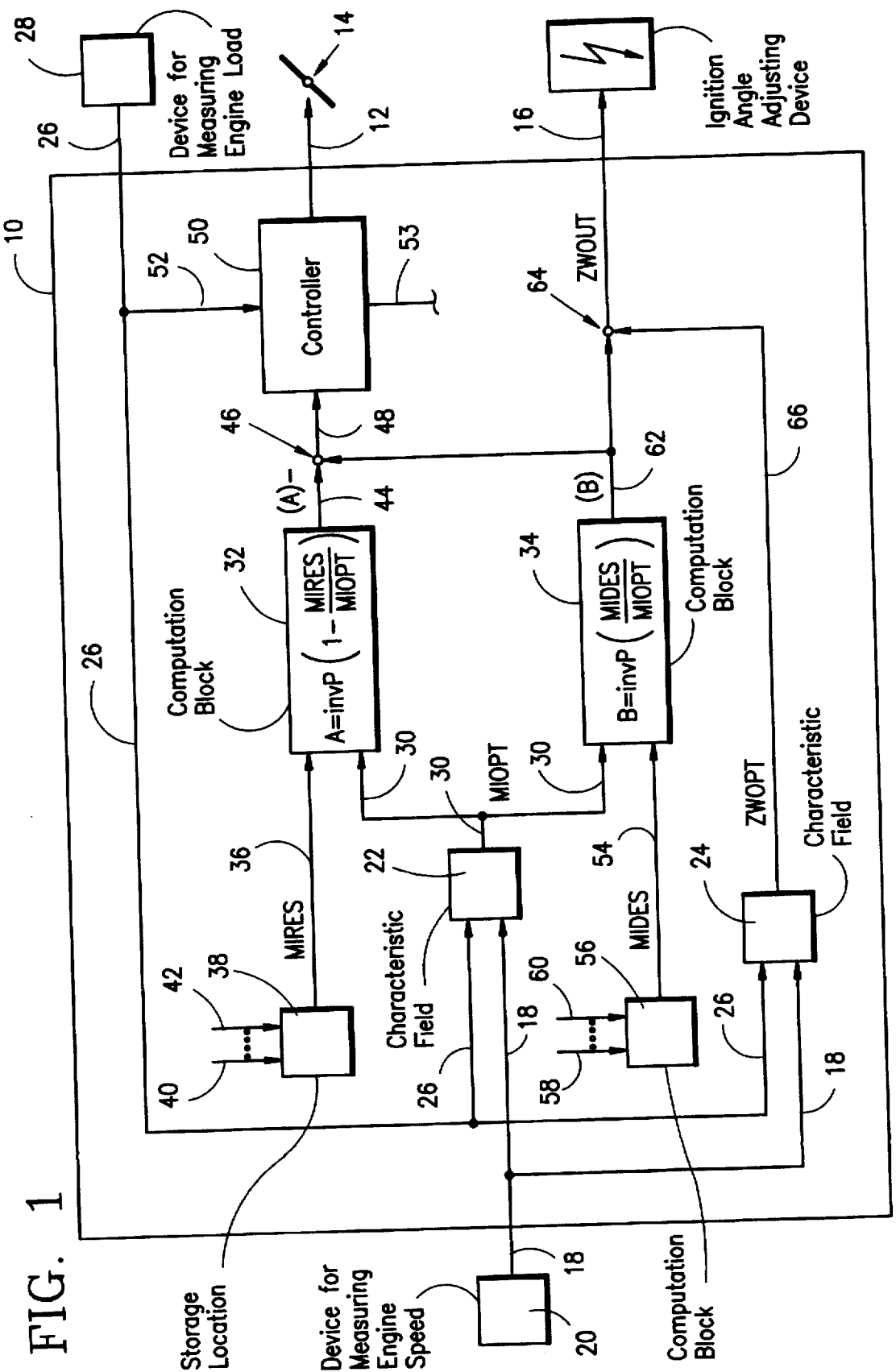
FIG. 1 shows an overview block circuit diagram of a control arrangement for the torque of an internal combustion engine; whereas, in FIGS. 2A–2D, the procedure of the invention is described with respect to time diagrams.
Figure 2A:
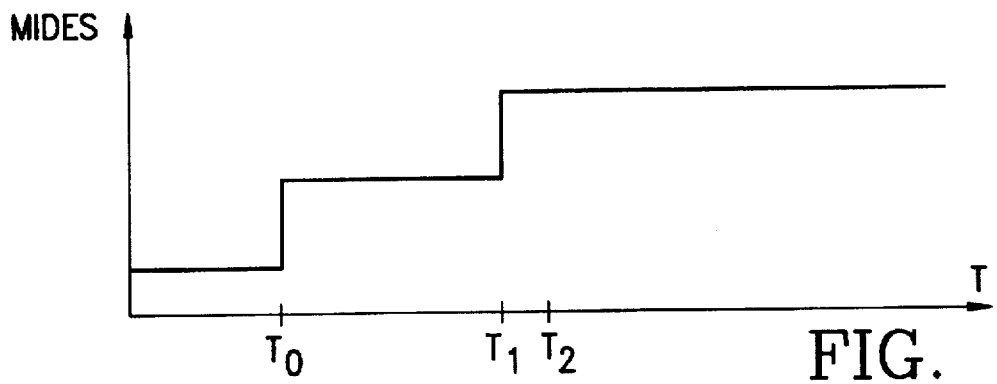
Figure 2B:
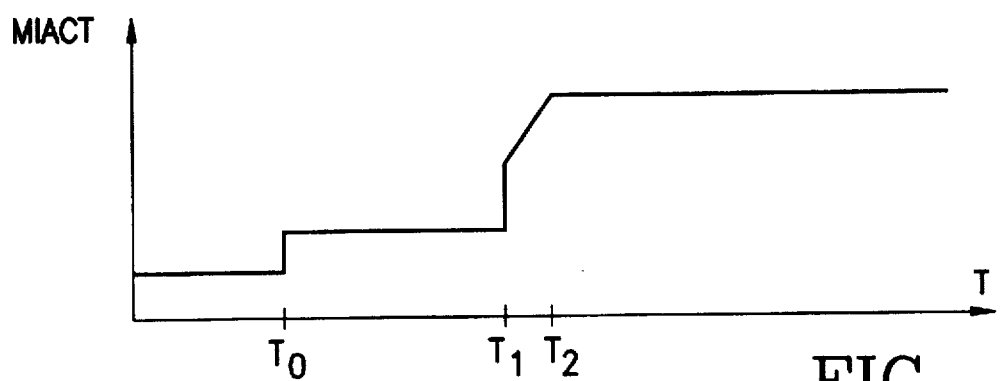
Figure 2C:
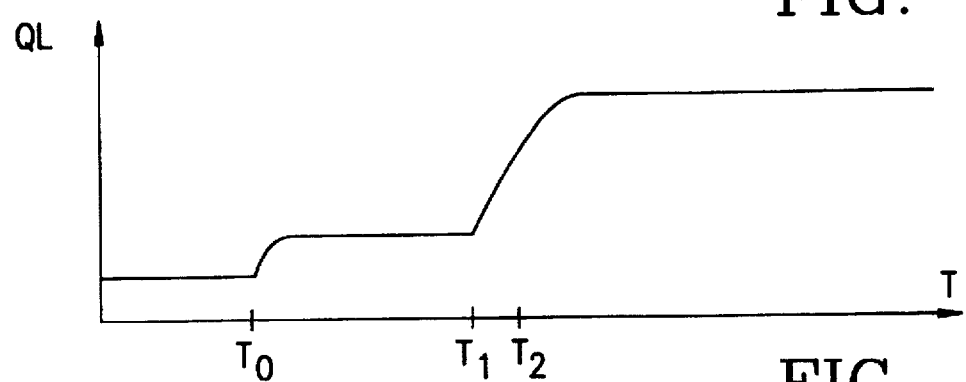
Figure 2D:
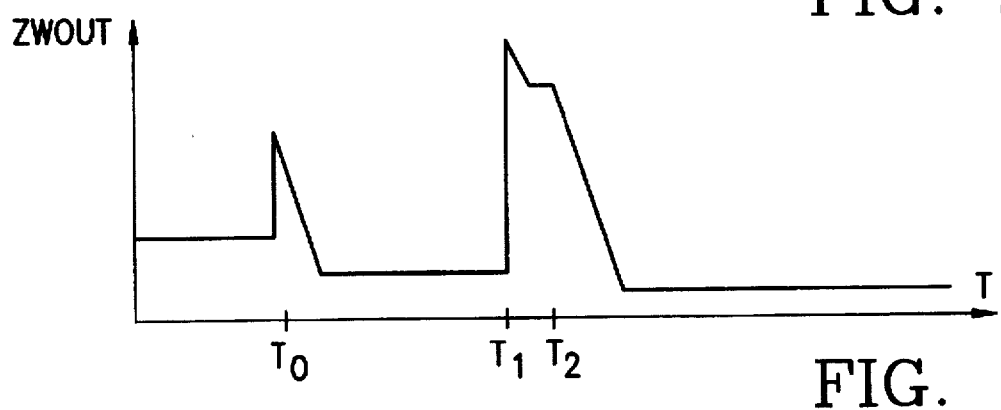

In FIG. 1, a control apparatus 10 is shown which influences the air supply to the engine with an electrically actuable positioning element via an output line 12. The positioning element 14 is preferably a throttle flap. Furthermore, the control apparatus 10 includes at least an output line 16 to influence the ignition time point of the engine. Input lines 18 and 26 connect the control apparatus 10 to a measuring device 20 for detecting the rpm of the engine and a measuring device 28 to detect the engine load (air mass, air quantity, intake pipe pressure, combustion chamber pressure, quotient of one of these quantities and the engine rpm, et cetera).

In a preferred embodiment, the control apparatus 10 includes at least one microcomputer which holds essential subprograms and which are shown in the block circuit diagram of FIG. 1 with the view to the procedure of the invention. The input line 18 leads to two characteristic fields 22 and 24 and the input line 26 from a measuring device 28 leads to these two characteristic fields as a second input line. The measuring device 28 is provided for detecting engine load. The output line 30 of the characteristic field 22 leads to a first computation block 32 and to a second computation block 34. A further input line 36 from a characteristic field (that is, a characteristic line, a table or a storage location 38) leads to the first computation block 32. Input lines 40 to 42, as required, are connected to the block 36. These lines 40 to 42 supply operating variables of the engine and/or of the vehicle from measuring devices (not shown).

The output line 44 of the computation block 32 leads to a logic element 46 having an output line 48 leading to a controller 50. At least one line 52 from the line 26 leads to the controller 50 as do further lines 53, as required, for the engine rpm. The output line of the controller 50 defines the output line 12 of the control apparatus 10.

A line 54 is connected to the computation block 34 and leads from a computation block 56. Operating variables of the engine and/or of the vehicle are supplied to the computation block 56 via the lines 58 to 60. The output line 62 of the computation block 34 leads, on the one hand, to the logic element 46 and, on the other hand, to a logic element 64. The line 66 from characteristic field 24 also leads to the logic element 64. The output line of the logic element 64 is the output line 16 of the control apparatus 10 and leads to an ignition angle adjusting device 31.

The basic idea of the invention is that an operating point of the engine is adjusted by controlling the ignition angle and the air supply to the engine with which a rapid change in torque is possible in the sense of increasing the torque and in reducing the torque. Accordingly, for a load change, the torque of the engine tracks the input without delay.

Each operating state of the engine is determined essentially by rpm and load. For each operating state, the pregiven engine torque MIDES is adjusted with the ancillary condition that the adjustment of the ignition angle takes place in such a manner that a pregiven torque reserve MIRES occurs. This means that, via an adjustment of the ignition angle in both directions, the engine torque can be changed at least by the amount of the torque reserve MIRES.

For all load/rpm points of the engine, the parabola P applies for the relationship between torque and ignition angle:

$$MI/MIOPT = P(ZWOUT - ZWOPT) \quad (1)$$

or its inverse function:

$$ZWOUT - ZWOPT = INVP(MI/MIOPT) \quad (2)$$

$$\text{with } P(x) = a^* x^2 + b^* x + c \text{ with } x = ZWOUT - ZWOPT \quad (3)$$

(ZWOPT=optimal ignition angle with the view to minimum fuel consumption; ZWOUT=outputted ignition angle; MI=outputted torque; MIOPT=outputted torque when adjusting the optimal ignition angle).

For controlling the engine, an ignition angle ZWOPT, which is to be adjusted, is read out of the characteristic field 24 in dependence upon rpm and load. The characteristic field 24 is pregiven in such a manner that the read-out ignition angle leads to an operation of the engine with the highest possible efficiency, that is, with the highest torque output possible for the least amount of fuel consumption. Correspondingly, in the pregiven characteristic field 22, starting with rpm and load, the outputted torque MIOPT is determined for the adjusted optimal ignition angle. The torque MIOPT is generated by the combustion and outputted by the engine. This characteristic field is also pregiven. The individual parameters are determined experimentally for each type of engine. A desired value for the torque is pregiven in the computation block 56 in dependence upon operating variables supplied via the lines 58 to 60. This torque is to be generated by the engine and outputted thereby. The operating variables are, for example, the actuating level of an operator-controlled element actuated by the driver. The operating variables also include intervention variables of additional control systems such as a drive slip control as well as the intervention variable of an idle rpm controller as in the present preferred embodiment of the idle control. This idle rpm controller determines the torque value to be adjusted in a manner known per se in accordance with a desired rpm, which is determined from operating variables, as well as the actual rpm. The input value for the torque can be supplied also via a communication system from another control apparatus.

In the preferred embodiment, and outside of the idle or near-idle region, and by adjusting the air supply and/or fuel supply to the engine at an optimal ignition angle, the torque is adjusted in the sense of causing the actual torque to approximate the desired value via a comparison of the desired and actual torques. This procedure is not shown in FIG. 1 so that an overview can be provided.

In the idle region or in the near-idle region, the torque generated by the engine is changed to compensate the load change at an rpm which remains constant or changes. The torque change takes place when there is a change of the engine load or when there are loads which adjust continuously. The first-mentioned engine load change can, for example, comprise switching on external loads such as the compressor of a climate control, an automatic transmission, et cetera. The continuously adjusting loads can, for example, be a power steering. Here, the above-described adjustment of the engine for an operation at high efficiency is problematical especially with torque increasing interventions because the torque change, which is needed to compensate for load or for rpm change, can be carried out only via a change of the air supply. This is so because a torque-increasing intervention via the ignition angle is not possible because of the optimal adjustment of the ignition angle. As a consequence thereof, the delays in the supply of air also cause a delay in the buildup of torque.

In a control system of the kind described above, the advantages of the least amount of fuel consumption and yet a delay-free tracking of the torque for a change of torque input as a consequence of changed load can be obtained. To achieve this, at least during idle and in the near-idle region or for active idle control, a reserve torque value MIRES is pregiven. This torque value is either pregiven as a fixed value with a view to a compromise between the largest possible torque reserve and the least possible influence on the consumption of fuel or, this torque is determined in dependence upon operating variables such as engine rpm, road speed, load state of the engine, engine temperature, et cetera from predetermined characteristic lines or characteristic fields. In general, at higher engine rpm or road speeds, a smaller value for the torque reserve is selected and at higher load and lower engine temperatures, a value greater in magnitude is selected for the torque reserve.

Therefore, and according to the invention, in at least one operating region of the engine, a torque reserve is pregiven which is made available by a common adjustment of the air supply and the ignition angle. For load changes, the necessary torque change is developed rapidly by adjusting the ignition angle in the context of a pregiven torque reserve.

For this purpose, and in computation block 32, a signal value A is computed on the basis of the torque reserve MIRES, which is supplied via the line 36, and torque value MIOPT, which is supplied via line 30. The computation is performed by applying the equation (2):

$$A = invP(1 - MIRES/MIOPT) \tag{4}$$

For the particular operating point of the engine, this quantity defines the desired state between the optimal ignition angle ZWOPT and the ignition angle ZWOUT to be outputted for which the pregiven torque reserve MIRES is adjusted.

In computation block 34, a quantity B is formed from the torque value MIOPT, which is supplied via line 30, and the torque desired value MIDES, which is supplied via line 54. The quantity B is likewise formed in accordance with equation (2):

$$B = invP(MIDES/MIOPT) \tag{5}$$

For the particular operating point of the engine, this quantity defines the required spacing to the optimal ignition angle ZWOPT in order to adjust the desired torque MIDES.

In operation at constant load (that is, a constant torque input), the ignition angle ZWOUT, which is to be outputted, is determined in the logic element 64 by adding the optimal ignition angle ZWOPT (line 66) and the quantity B (line 62). Correspondingly, the value to adjust the air supply to the engine for adjusting the torque reserve and the torque input results on the output line of the logic element 46 via a subtraction of the quantity A from the line B. This value is supplied to the controller 50 which, either in the context of a control loop in accordance with a pregiven control strategy or in the context of a precontrol, adjusts the air supply to the engine via line 12 by adjusting the throttle flap 14. In an advantageous embodiment, as a control variable, the load quantity detected by the measuring device 28 or the quotient of this quantity is used with the rpm.

In the stationary state, when the required torque reserve is present for a pregiven ignition angle, then the quantities A and B are equal. In this steady-state operational case, it is not necessary to influence the air supply.

If, at the actual operating point of the engine, the adjusted torque reserve is greater than the pregiven torque reserve, then the quantity B is less than the quantity A. The controller 50 will then reduce the air supply as a consequence of its negative input value and bring the engine to an operating point of lower load. This load change is considered when the ignition angle is adjusted by feedback via the characteristic fields 22 and 24 so that then, as a consequence of the reduction of the air supply, an earlier torque increasing ignition angle is outputted until the quantities A and B are equal.

If the torque reserve is less than the pregiven value, then the quantity B is greater than the value A. As a consequence of its positive input signal, the controller 50 brings the engine to an operating point of higher load, that is, the controller increases the air supply. The ignition angle is then controlled via feedback in the direction "retard", that is, in the direction to reduce torque until the quantities A and B are equal.

In summary, it can be stated that with the control arrangement shown in FIG. 1, and by influencing the ignition angle and the air supply in the operating state without load change, the pregiven torque reserve is always adjusted in that the ignition angle is adjusted to a value which is retarded with respect to the characteristic field ignition angle (characteristic field 24, ZWOPT).

If the load on the engine changes, then the torque input value MIDES changes. If the change of the input value is less than the adjusted torque reserve, then the ignition angle to be outputted is influenced by the computation block 34, the quantity B and the logic element 64 in such a manner that the required change of the engine torque is immediately adjusted without delay. If the torque subsequently remains unchanged, an automatic control to a new load point while adjusting the torque reserve takes place as described above.

If the needed change of the torque is greater than the available torque reserve, the computation block 34 triggers an immediate control of the ignition angle to the angle of the characteristic field 24. The actual torque of the engine is then brought in a jump-like manner without delay to the value of the characteristic field 22. However, the input value of the torque is not yet reached in this manner. The consequence of this is that a change of the air supply takes place via the computation block 32 utilizing the quantity A determined there as well as utilizing the quantity B. This then adjusts the torque and therefore the rpm to the desired value. If, after the end of the control process, the torque value corresponds to the desired value, then, as shown above, the pregiven torque reserve is adjusted by controlling the ignition angle and the air.

If a negative load change is present (that is, if the desired torque becomes less than the instantaneous engine torque), a retarding change of the ignition angle with subsequent load reduction of the engine occurs until the pregiven torque reserve is adjusted again at the new operating point.

The effects of the procedure of the invention are shown in FIG. 2 with the aid of time diagrams. In FIG. 2a, the desired torque value MIDES is plotted as a function of time and in FIG. 2b, the actual torque MIACT is plotted as a function of time. In FIG. 2c, a quantity Q for the air supply is plotted as a function of time and, in FIG. 2d, the outputted ignition angle ZWOUT is plotted as a function of time.

Up to the time point $T_0$, the desired torque is assumed to be constant. The engine is then operated at a pregiven adjustment of the air supply Q and the ignition angle ZWOUT. A pregiven torque reserve MIRES is adjusted via the ignition angle. At time point $T_0$, a jump occurs in the desired torque as a consequence of a load increase. This load increase is, in magnitude, less than the adjusted torque reserve. This leads at time point $T_0$ to a jump-shaped adjustment of the ignition angle to be outputted which, is to be so measured that, at time point $T_0$, the engine torque tracks the desired value without delay. After time point $T_0$, the torque reserve is again restored by reducing the ignition angle and increasing the air supply.

At time point $T_1$, a jump in the desired torque takes place by switching on a further load and this desired torque jump is greater than the adjusted torque reserve. This leads, at time point $T_1$, to a jump-shaped adjustment of the ignition angle to ZWOPT, which causes a corresponding adjustment of the actual engine torque to take place. The torque reserve is not sufficient for compensating for the jump in the desired value. For this reason, after time point $T_1$, and as a consequence of the idle controller function, an increase in the air supply and therefore of the actual torque is made. At time point $T_2$, the jump in the desired torque is compensated so that, after time point $T_2$, the required torque reserve is adjusted in correspondence to the procedure after the time point To by controlling the ignition angle and the air.

Figure 3:
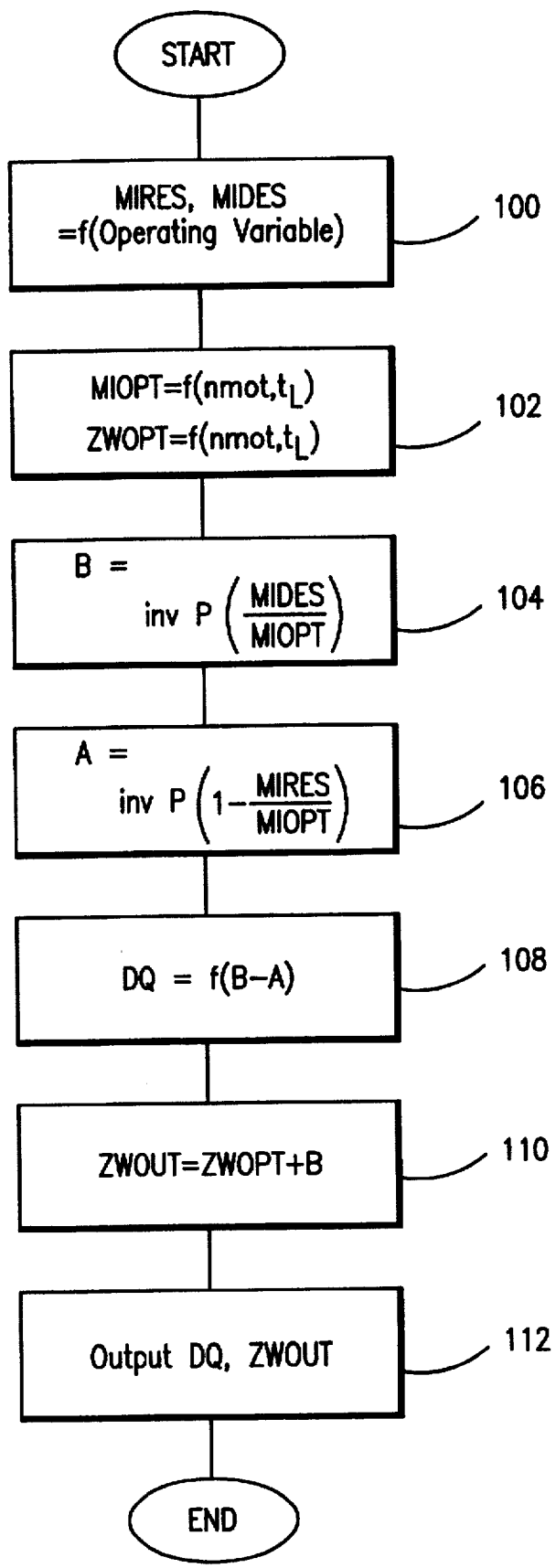
FIG. 3 indicates the realization of the invention as a computer program in the context of a flowchart.

In the preferred embodiment, the procedure of the invention is configured as part of the program of a microcomputer. Suggestions with respect to one such program for realizing the procedure of the invention are presented in FIG. 3.

After the start of the subprogram at pregiven time points, in a first step 100, the values, which are dependent, as required, from operating variables, are read in for the torque reserve MIRES and the torque desired value MIDES. Thereafter, in step 102, the optimal ignition angle ZWOPT as well as the adjusted engine torque MIOPT is determined on the basis of the pregiven characteristic fields and in dependence upon the actual operating point, which is determined from the engine rpm and the engine load. Thereafter, in step 104, the quantity B and, in the next step 106, the quantity A are computed from the above-mentioned equations (4) and (5). In the next step 108, the air supply change DQ is computed in the controller as a function of the difference of the signals B and A. In step 110, the ignition angle ZWOUT, which is to be outputted, is computed as the sum of the optimal ignition angle ZWOPT and the quantity B. Thereupon, in step 112, the air control value DQ as well as the ignition angle value ZWOUT are outputted. Thereafter, the subprogram is ended and repeated at a given time.

In summary, it can be stated that, in the context of the procedure of the invention, the engine is driven always at an operating point in which a pregiven torque reserve is present via the ignition angle, at least in idle and/or in a region near idle. As required, this reserve can be made available as positive torque without delay via a corresponding jump in the ignition angle. Furthermore, the adjustment of the engine is automatically adapted to each load point so that, in the steady-state condition, the same torque reserve is present for a later load jump independently of the instantaneous operating point.

We claim:

1. A method for controlling a torque of an internal combustion engine of a motor vehicle, said engine and said motor vehicle having operating variables which include: a variable indicative of an actuated level of an operator controlled element actuated by a driver of said motor vehicle, a variable of an additional control system of said engine and said motor vehicle, a variable indicative of engine speed (n), a variable indicative of road speed, a variable indicative of engine load ($t_L$) and a variable indicative of engine temperature, said engine having air adjusting device for adjusting air (DQ) supplied to said engine and an ignition angle adjusting device for adjusting an ignition angle (ZW) of said engine, said engine further having a control apparatus connected to said air adjusting device for controlling said air (DQ) and to said ignition angle adjusting device for controlling said ignition angle (ZW), said method comprising the steps of:

determining a desired torque (MIDES) as a function of at least one of said operating variables of at least one of said engine and said motor vehicle;

determining a reserve torque (MIRES) based on at least one of:
- (i) at least one of said operating variables of said engine and said motor vehicle; and,
- (ii) a fixed value predetermined for said engine;

determining a quantity (MIOPT) representing said torque of said engine based on said engine load ($t_L$) and said engine speed (n);

controlling said air (DQ) supplied to said engine via said air adjusting device on the basis of said desired torque (MIDES) and said reserve torque (MIRES); and, calculate an ignition angle signal (ZWOUT) to control said ignition angle adjusting device on the basis of said desired torque (MIDES) and said quantity (MIOPT) to obtain a shift of said ignition angle (ZW) which causes said torque of said engine to increase at least by an amount corresponding to said reserve torque (MIRES) whereby said torque of said engine is maintained at said desired torque (MIDES).

2. The method of claim 1, wherein the adjustment of the reserve torque (MIRES) takes place at least in one of idle and near idle.

3. The method of claim 1, wherein an ignition angle, which is optimal for consumption and torque, is corrected so that said reserve torque (MIRES) is present.

4. The method of claim 1, wherein a desired value for the torque, which is to be developed by said engine, is pregiven; and, said desired value is adjusted by adjusting said air (DQ) and said ignition angle (ZW).

5. The method of claim 4, wherein: for a change of the desired value via load change, an immediate change of the ignition angle to compensate the desired value change is carried out and, thereafter, the pregiven torque reserve is again restored by controlling air supply and ignition angle.

6. The method of claim 1, wherein: said reserve torque (MIRES) corresponds to the deviation of the torque, which is developed by said engine, from an optimal torque which, in turn, results from an adjustment of a predetermined optimal ignition angle.

7. The method of claim 1, wherein the adjustment of said ignition angle (ZW) and said air (DQ) for preparing said reserve torque (MIRES) is computed in accordance with a parabola-shaped relationship between the deviation of said ignition angle (ZW) from a predetermined optimal ignition angle as well as of said torque from said predetermined optimal engine torque.

8. The method of claim 1, wherein a change of said torque to be outputted essentially takes place without delay by changing the adjustment of said ignition angle in the context of said reserve torque (MIRES).

9. A system for controlling a torque of an internal combustion engine of a motor vehicle, said engine and said motor vehicle having operating variables which include: a variable indicative of an actuated level of an operator controlled element actuated by a driver of said motor vehicle, a variable of an additional control system of said engine and said motor vehicle, a variable indicative of engine speed (n), a variable indicative of road speed, a variable indicative of engine load ($t_L$) and a variable indicative of engine temperature, said engine having an air adjusting device for adjusting air (DQ) supplied to said engine and an ignition angle adjusting device for adjusting an ignition angle (ZW) thereof, said system comprising:

a control apparatus connected to said air adjusting device for controlling said air (DQ) and to said ignition angle adjusting device for controlling said ignition angle (ZW);

sensor means for detecting said operating variables;

said control apparatus functioning to:
- (a) calculate a desired torque (MIDES) as a function of at least one of said operating variables of said engine and said motor vehicle;
- (b) provide a reserve torque (MIRES) based on at least one of:
  - (i) at least one of said operating variables of said engine and said motor vehicle; and,
  - (ii) a fixed value predetermined for said engine;
- (c) calculate a quantity (MIOPT) representing said torque of said engine on the basis of said engine load ($t_L$) and said engine speed (n);
- (d) control said air (DQ) for said engine on the basis of said desired torque (MIDES) and said reserve torque (MIRES); and,
- (e) calculate an ignition angle signal (ZWOUT) to control said ignition angle adjusting device on the basis of said desired torque (MIDES) and said quantity (MIOPT) to obtain a shift of said ignition angle (ZW) which causes said torque of said engine to increase at least by an amount corresponding to said reserve torque (MIRES) whereby said torque of said engine is maintained at said desired torque (MIDES).

* * * * *

UNITED STATES PATENT AND TRADEMARK OFFICE
CERTIFICATE OF CORRECTION

PATENT NO. : 5,765,527
DATED : June 16, 1998
INVENTOR(S) : Vera Lehner and Gerard Melchior It is certified that error appears in the above-identified patent and that said Letters Patent is hereby corrected as shown below:

In column 2, line 23: delete "36" and substitute -- 38. -- therefor.

In column 5, line 60: after "which", delete ",".

In column 6, line 11: delete "To" and substitute -- $T_0$ -- therefor.

In column 6, line 21: delete "is" and substitute -- are -- therefor.

In column 6, line 57: between "having" and "air", insert -- an --.

In column 7, line 12: delete "calculate" and substitute -- calculating -- therefor.

Signed and Sealed this

Seventh Day of September, 1999

Attest:

Q. TODD DICKINSON

*Attesting Officer*   Acting Commissioner of Patents and Trademarks